Nov. 29, 1949     K. L. BASTRUP     2,489,362
LINE FILTER
Filed Sept. 11, 1946     2 Sheets—Sheet 1
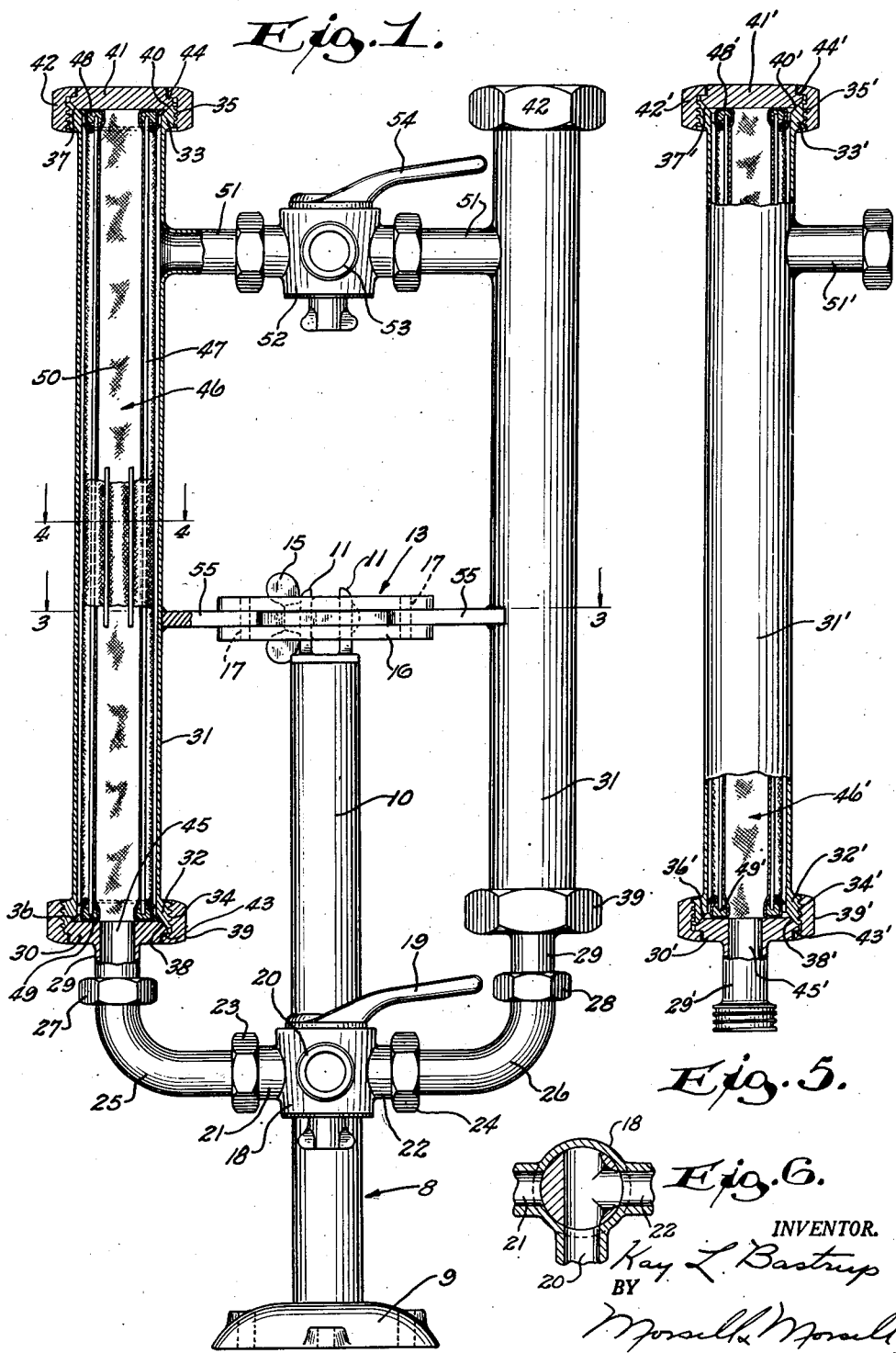
INVENTOR.
Kay L. Bastrup
BY
Morsell & Morsell
ATTORNEYS.

Nov. 29, 1949     K. L. BASTRUP     2,489,362
LINE FILTER

Filed Sept. 11, 1946     2 Sheets-Sheet 2

INVENTOR.
Kay L. Bastrup
BY Morsell & Morsell
ATTORNEYS.

Patented Nov. 29, 1949

2,489,362

UNITED STATES PATENT OFFICE 2,489,362

LINE FILTER

Kay L. Bastrup, Kenosha, Wis., assignor to Tri-Clover Machine Co., Kenosha, Wis., a corporation of Wisconsin Application September 11, 1946, Serial No. 696,103

2 Claims. (Cl. 210—168)

This invention relates to improvements in line filters.

In the handling of milk or other liquid food products it is usually necessary to utilize filters for removing foreign matter as liquid is being conveyed through a pipe line for transfer from one vat or container to another. Inasmuch as any filter employed must be cleaned at regular intervals, it is highly desirable to provide a filter assembly which will simplify the cleaning operation while still providing for an efficient filtering action during use.

It is, therefore, a general object of the invention to provide an improved filter assembly wherein the filter element may be quickly removed without necessitating the removal or knocking down of the entire assembly.

A further object of the invention is to provide, in one form of the invention, means whereby a double filter assembly may be utilized in such a way that the element of one of the filter units may be removed without shutting off the line flow or interfering with the filtering action of the filter unit.

A further object of the invention is to provide a double line filter assembly including a supporting stand and means whereby the filter may be quickly removed from the stand for a complete cleaning operation.

Other objects of the invention are to provide a line filter which is particularly well adapted for sanitary installations, which is simple and inexpensive in construction, and which is otherwise well adapted for the purposes described.

With the above and other objects in view, the invention consists of the improved line filter, and all its parts and combinations, as set forth in the claims, and all equivalents thereof.

In the accompanying drawings, illustrating two complete embodiments of the invention in which the same reference numerals designate the same parts in all of the views:

Fig. 1 is a front elevational view of a double filter assembly, parts being broken away to illustrate one of the units in vertical longitudinal section;

Fig. 5 is an elevational view of a single filter installation, with parts broken away and shown in longitudinal section; and Fig. 6 is a horizontal sectional view through one of the three way valves.

Figure 3:
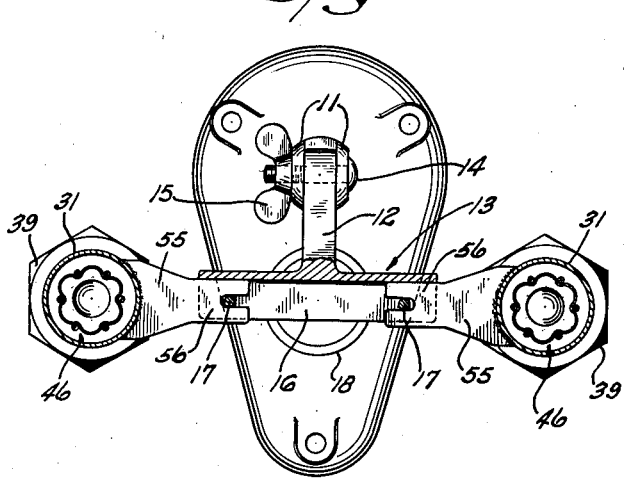
Fig. 3 is a sectional view taken on the line 3—3 of Fig. 1.
Figure 2:
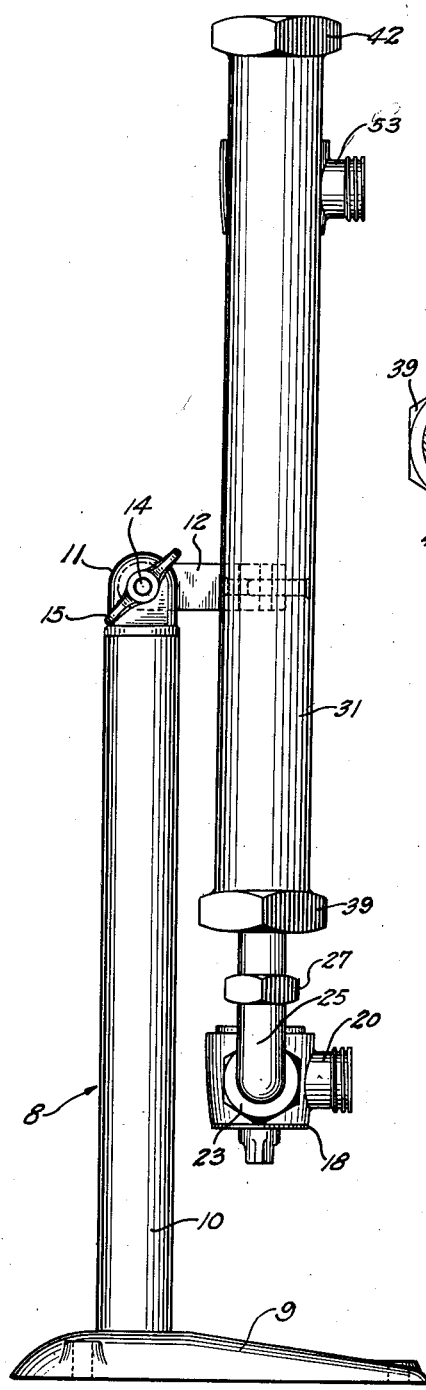
Fig. 2 is a side view of the structure of Fig. 1.

Referring more particularly to the drawings, the double filter installation of Figs. 1 to 4 inclusive, includes a stand 8 having a base 9 and having an upright support 10 provided with apertured ears 11 projecting upwardly from its upper end. Positioned for angular adjustable movement between the ears 11 is an arm 12 of a bracket 13. A bolt 14 extending through the apertures of the ears and through an aperture in the end of the arm 12 is equipped with a winged nut 15 by means of which the bracket 13 may be releasably clamped in a desired angular position. The bracket 13 has a channel-shaped portion 16 provided with transverse pins 17.

Referring now to the filter assembly proper, there is a three-way inlet valve 18 having a handle 19, an inlet extension 20, and outlet extensions 21 and 22.

The outlet extensions 21 and 22 are connected by union nuts 23 and 24 with elbows 25 and 26, and the latter are in turn connected by union nuts 27 and 28 with tubular extensions 29 from end caps 30. Inasmuch as the filter units on the two sides of the double assembly are identical in construction, a description of the unit on one side will suffice for the unit on the other side.

Each unit has an outer tubular casing 31 having its ends externally enlarged, as at 32 and 33, with the enlargements being threaded, as at 34 and 35. In addition, the enlarged ends are formed with internal tapered seats 36 and 37. The tapered seat 36 cooperates with a taper 38 on the cap 30 and the two are clamped in assembled relationship by means of a union nut 39.

At the upper end the internal tapered seat 37 cooperates with a tapered seat 40 formed on a top cap 41. A union nut 42 holds the cap 41 in assembled position. During assembly the inwardly projecting annular flange of the union nut co-acts with an annular shoulder 43 on the cap 30, and the top union nut 42 co-acts with an annular shoulder 44 on the top cap 41.

The cap 30 is of substantially larger diameter than the diameter of the bore 45 in the extension 29 so that the portion of the inner face of the cap which surrounds the bore 45 forms a seat for supporting the lower end of a filter element 46.

Figure 4:
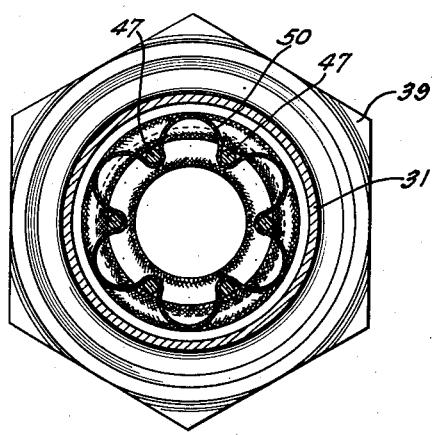
Fig. 4 is an enlarged sectional view taken on line 4—4 of Fig. 1.

The filter element may be of any satisfactory type such as a cartridge type or a cage and bag type. The latter type is illustrated in the drawing wherein the cage comprises spaced longitudinal wires 47 which are connected to end rings 48 and 49. Supported within the wire cage 47 is a fabric filter bag 50 having its ends detachably secured over the end rings 48 and 49. During use, the pressure of fluid within the bag 50 forces it outwardly into the spaces between the wires of the cage, as is indicated in Figs. 1 and 4.

The casing 31 for each filter unit is of such length with respect to the length of the filter cage or cartridge 46 that when the latter is inserted in assembled position, as in Fig. 1, and when the top union nut 42 is threaded in place, the filter cage or cartridge will be clamped and held between the top and bottom caps 30 and 41. The thickness of the fabric covered ring 49 at the bottom is such as to fit the annular shelf formed by the inner face of the cap 30 and surrounding the bore 45.

The casings 31 are connected by tubular extensions 51 with an outlet valve 52 having an outlet extension 53 and having an operating handle 54. The valve 52 has three ports and is constructed identically to the valve 18.

Rigidly connected to the sides of the casings 31 and projecting toward one another, are lugs 55 having slotted ends 56 (see Fig. 3) which are shaped to be insertable in the ends of the channel 16 of the bracket 13 to cooperate with the pins 17 in the manner shown in Figs. 1 and 3.

The single filter assembly of Fig. 5 is constructed in an identical manner to one of the sides of the double filter assembly of Fig. 1, and the same numerals primed are applied thereto to indicate the corresponding parts.

In use of the double filter assembly of Figs. 1 to 4 inclusive, if it becomes necessary to replace one of the filter elements 46, it is first necessary to turn the valve handles 19 and 54 away from the unit 31 which is to have its filter element changed. With the valve handles in the position shown in Figs. 1 and 6 the filter element on the side shown in section may be changed while complete filtering action is taking place through the other side without any interruption in line flow.

To remove the cartridge, the union nut 42 is removed to release the cap 41. Upon removing the latter, the entire filter element 46 may be pulled out. If the bag type of filter, such as that illustrated, is used, the bag is removed from the cage and replaced in the customary manner. If a cartridge type of filter is used, the mesh of the cartridge is cleaned. The cleaned or renewed filter element may then be replaced in the cage 31, and the cap 41 and nut 42 reassembled.

To replace or renew the filtering element on the opposite side, the valve handles 19 and 54 are turned to a reverse position from that shown in Fig. 1 to direct the flow through the side shown in section. This then permits replacement of the bag or cartridge on the second side without in any way interfering with line flow.

If it becomes necessary to clean the entire filter assembly, including all of the conduits, this may be easily accomplished by disconnecting the inlet 20 from the inlet line and by removing the assembly from the stand 8.

With the single filter of Fig. 5, while it is necessary to shut off the line flow when changing the bag or cartridge, it is nevertheless possible to remove the bag or cartridge in the same simple way as in Fig. 1 without necessitating a removal of the entire unit 31'.

During normal use of the installation of Fig. 1, with the handles of the valves 19 and 54 turned so that all three ports are interconnected, the liquid will flow continually through both sides and be filtered by both units and the filtered liquid will be directed out of both lines 51 and ultimately through the outlet 53.

Various changes and modifications may be made without departing from the spirit of the invention, and all of such changes are contemplated as may come within the scope of the claims.

What I claim as the invention is:

1. A double line filter comprising a pair of filter units each including an elongated tubular casing formed with a lug projecting from an intermediate portion thereof, a cap for one end of each casing, each cap having a liquid opening, means for detachably securing said caps in position, a liquid conduit connected to the opening of each cap, a three-way inlet valve removably connected to both of said liquid conduits for controlling the admission of liquid into said conduits, an elongated tubular filter element within each tubular casing, a cap at the opposite end of each tubular casing from the admission end, means for detachably securing each of said last-mentioned caps in position, each casing having a liquid outlet conduit intermediate its length, a three-way valve removably connected to both of said outlet conduits for controlling the discharge of a liquid from said outlet conduits, a pedestal adapted to provide a fixed support, and a substantially T-shaped member pivotally and detachably connected to an upper portion of said pedestal and detachably connected to the projecting lugs of the tubular casings.

2. A double line filter comprising a pair of filter units each including an elongated tubular casing formed with a lug projecting from the exterior thereof; a cap for one end of each casing, each cap having a liquid opening; means for detachably securing said caps in position; a liquid conduit connected to the opening of each cap; means including a three-way valve for controlling the admission of liquid into said conduits and for connecting the filter units; an elongated tubular filter element within each tubular casing having an end supported on said cap; a cap at the opposite end of each tubular casing from the admission end; means for detachably securing each of said last-mentioned caps in position in engagement with the opposite end of said filter element, each casing having a liquid outlet conduit intermediate its length; means including a three-way valve for controlling the discharge of a liquid from said outlet conduits; a support; and a bracket detachably connected to said casing lugs and to said support in a manner to permit simultaneous removal of said filter units from said support while said units are connected to each other.

KAY L. BASTRUP.

REFERENCES CITED

The following references are of record in the file of this patent:

UNITED STATES PATENTS

| Number | Name | Date |
| --- | --- | --- |
| 455,574 | McDonald | July 7, 1891 |
| 1,223,299 | Taylor | Apr. 17, 1917 |
| 1,580,065 | Merriman | Apr. 6, 1926 |
| 1,645,364 | Weaver | Oct. 11, 1927 |
| 1,940,923 | Stringer | Dec. 26, 1933 |
| 2,271,814 | Coolidge | Feb. 3, 1942 |